Sept. 19, 1972  J. M. MATLOFF ET AL  3,692,648
PROCESS FOR OXYGENATING BLOOD AND APPARATUS
FOR CARRYING OUT SAME
Filed March 24, 1970

INVENTORS
JACK M. MATLOFF
ROBERT A. SANFORD
BY

Cesari and McKenna
ATTORNEYS

United States Patent Office

3,692,648
Patented Sept. 19, 1972

3,692,648
PROCESS FOR OXYGENATING BLOOD AND APPARATUS FOR CARRYING OUT SAME
Jack M. Matloff, Los Angeles, Calif., and Robert A. Sanford, Marblehead, Mass., assignors to Meditech Energy and Environmental Corporation, Inc., Danvers, Mass.
Filed Mar. 24, 1970, Ser. No. 22,408
Int. Cl. C01b 13/04; B01k 1/00
U.S. Cl. 204—129                    16 Claims

ABSTRACT OF THE DISCLOSURE

A blood oxygenating device comprising an oxygen-generating electrode in a blood-oxygenating compartment and carbon dioxide-permeable windows for removing carbon dioxide from the blood being oxygenated therein.

BACKGROUND OF THE INVENTION

(A) Field of the invention

This invention relates to a process and apparatus for introducing oxygen into blood and removing $CO_2$ therefrom.

(B) The prior art

During recent years, there has been considerable effort made by various individuals and groups to provide an improved blood oxygenator. In general, blood oxygenators are used to provide oxygen to blood which has lost its usual oxygenating means. For example, in some inter vivos medical procedures, it is desirable that the heart and/or lungs be made temporarily inoperative; in such situations, the blood must be cycled through external appartaus which performs the essential functions normally performed by the lungs. Also, it is sometimes desirable that oxygenators be used to facilitate procedures whereby the pumping of blood by the heart is interrupted for a longer period of time so that the heart may be rested to allow healing of some defect therein. Moreover, such blood-oxygenating is of growing significance to the maintenance of donated organs during the period between the death of the donor and the placement of the organ in the recipient.

One type of blood oxygenator is that providing an oxygen-permeable membrane interface between the blood and a source of oxygen gas. A large membrane surface is required for achieving the desired quantity of oxygen gas flow into the blood. This flow is usually limited by the nature of a blood-derived layer adjacent the membrane surface; therefore, use of membranes having improved oxygen-transfer characteristics has not resulted in any significant improvements in oxygenators constructed therewith. For this reason, a considerable amount of development has been directed to such design objectives as cramming the largest amount of membrane area into the smallest practical volume, achieving the optimum flow velocity and distribution along the membrane surfaces of the resulting equipment, and providing effective seal designs for the apparatus. Consequently, such oxygenators are of excessive complexity of design, and excessive cost.

Other oxygenating devices have been suggested, from time to time, which would not use a membrane-moderated oxygen-infusion procedure. Such devices, however, have been bulky requiring various valves, meters and the like. Such devices must comprise some means to assure that oxygen is properly distributed within the blood without excessive agitation. Most such blood oxygenators require an excessively large gas-blood interface and, as a result, cause an undesirable denaturization of the plasma components of the blood.

Another type of oxygenator is the so-called "filmer" type which acts by spreading out a swiftly-moving stream of blood into a relatively thin film. Gas exchange takes place when this thin film is exposed to oxygen.

Hematologic studies on such prior art blood oxygenators have shown that blood trauma is still too severe to be fully compensated for by the body.

Finally, of course, all blood oxygenators must comprise, or be used in conjunction with, a means for removing carbon dioxide from the blood. In membrane-moderated oxygenators, $CO_2$ removal is normally accomplished through the same membrane material that is used for oxygen addition. Clearly, this type of apparatus is relatively inflexible with respect to designing into it various oxygen: carbon dioxide permeability ratios.

SUMMARY OF THE INVENTION

Therefore, it is an object of the present invention to provide an improved blood oxygenator.

It is another object of the invention to provide a novel blood oxygenator incorporating means to remove carbon dioxide from the blood being oxygenated, said means being independent of the means for introducing oxygen to the oxygenator.

Another object of the invention is to provide an improved process for oxygenating blood.

A further object of the invention is to provide a process for oxygenating blood wherein at least some of the oxygen may be transferred into the blood in nascent form.

Another object of the invention is to provide an oxygenator in which the oxygenating level is readily controlled.

A further object of the invention is to provide an improved oxygenator of compact design in respect to its blood-oxygenating capacity.

Other objects of the invention will be obvious to those skilled in the art on reading the instant invention.

The above objects have been substantially attained by construction of an oxygenating device which comprises a blood oxygenating compartment, means to supply needed oxygen to blood flowing through this compartment, and, in the most advantageous embodiment of the invention, a carbon dioxide-permeable, blood retentive barrier forming means to facilitate removal of carbon dioxide from the blood being oxygenated.

The means for supplying needed oxygen is advantageously an electrode in contact with the blood itself, that is, an electrode which is within the aforesaid oxygenating compartment. This electrode is suitably an anode formed in conjunction with an electrolyte-bearing membrane barrier and used in conjunction with a cathode which is mounted in an adjacent compartment. The second compartment is separated from the oxygenating compartment by the electrolyte-bearing membrane barrier. An aqueous medium, conveniently water or saline solution, is circulated through this second compartment. This aqueous medium forms means to remove hydrogen gas evolved at the cathode and also provides a source of water to be subjected to electrolysis at the cathode.

The electrolyte-bearing membrane barrier can be formed of any combination of a dimension-stabilizing matrix and an electrolyte which is substantially impermeable to the flow of liquid and allows the required electrolytic character to be maintained.

Thus the membrane barrier can be a substantially pore-free polymeric material or a porous polymeric barrier so long as an electrolyte liquid is immobilized therein to provide an electrolytic path thereacross. Similarly the barrier could be a fibrous material, e.g., asbestos, suitably impregnated with an immobilized electrolyte. The preferred membranes are formed of hydrophilic, organic, film-forming polymers, particularly those having an integral cation exchange capacity.

This membrane provides an electrolyte path through which oxygen ions which have been generated by the electrolysis of water at the cathode are transported to the anode where oxygen gas is evolved in the nascent or molecular state.

To facilitate the decomposition of water, it is desirable to use an electrolysis-promoting catalyst such as those based on finely divided noble metals like platinum, rhodium, ruthenium, iridium black or such catalysts as tungsten oxide, boron carbide or even carbon. Platinum black is a particularly suitable catalyst. These catalysts are conveniently impregnated at each surface of the ion-exchange membrane.

The catalyst is applied to the ion exchange membrane by known methods, e.g. it may be dispersed in a toluene-based suspension, spread onto the membrane surface, preferably at a loading of about twenty grams per square foot of membrane, and pressed into the polymeric surface of the membrane in order that it may adhere thereto.

Collector screens formed of gold, stainless steel, tantalum, graphite or the like are used in conjunction with, really as integral parts of, the anode and the cathode.

One ion-exchange membrane conveniently selected for use is a linear sulfonated organic polymer having a fluorinated carbon chain. This material is available under the trade designation XR-per (fluorosulfonic acid) membrane from E. I. du Pont de Nemours and Co. This cationic membrane has a thickness of about 10 mils when dry, has an equivalent molecular weight of about 1200, and a resistivity of 150 ohm-centimeters when in the potassium ion form. This membrane is immersed in boiling water for 30 minutes and cooled before application of catalyst thereto.

One silicone rubber membrane that has been used to advantage is that known as the Melrose membrane and available from the Royal Post-Graduate Medical School in London, U.K. This membrane has a gas permeability, measured in $$\frac{\text{Cc. gas RTP, cm.}}{\text{sec. cm.}^2 \text{ mm. Hg}\Delta P}$$

of 60 units of oxygen and 325 units of carbon dioxide. "RTP" is room temperature and pressure, about 25° C. and 14.7 p.s.i.g. Another suitable membrane is that sold by Dow Corning and formed of a material sold under the trade designation Medical Grade Silastic S–2000. This membrane will pass 519,000 cc. per mil of $CO_2$ per 24 hours per square foot.

Among the advantages of the instant invention is the fact that under typical operating conditions, it can oxygenate more blood than a conventional blood oxygenator. For example about 40 cc. per minute of oxygen can be supplied readily per square foot of ion exchange membrane as utilized in the present invention, whereas rates of only about 15 to 20 cc. of oxygen are achieved with conventional membrane-moderated oxygenation processes. Such data is based on operating current density of 10 amps per square foot of effective membrane surface area. In practice even higher current densities may be used.

In typical situations, it may be necessary to provide oxygen to a baby or to a 170-pound adult. In a situation where the baby requires 9 cc. per minute of oxygen and the adult requires 240 cc. per minute, the following Table I indicates the amount of membrane area required when the oxygen is supplied (a) through a linear, sulfonated, organic, polymeric ion exchange membrane utilized according to the instant invention with various current densities and (b) a silicone membrane 2 mils thick having an oxygen permeability of 10 cc. of oxygen per square foot at a 0.5 atmosphere partial pressure.

TABLE I

| Membrane | Current density (amps per square ft.) | Area required, ft.$^2$ | |
|---|---|---|---|
| | | Baby | Adult |
| Ion exchange | 20 | 0.11 | 3.0 |
| Do | 50 | 0.045 | 1.2 |
| Silicone | N.A. | | 22.0 |

The fact that the $CO_2$ removal means is independent from the oxygenating surfaces, allows one to avoid the problem whereby $CO_2$ is accumulated (respiratory acidosis) or depleted (respiratory alkosis) from the blood. Another advantage of the device is that it requires a relatively small blood volume. It is anticipated that this approach will minimize plasma denaturization.

A particularly surprising feature of the invention is the fact that use of a sodium chloride solution in the electrolysis compartment does not result in the evolution of chlorine in the oxygenating compartment, even when the apparatus is operated at voltages over 2 volts. In general, however, operating voltages between 1 and 2 volts are most advantageous with a potential of about 1.3 volts being close to optimum. Control of the voltage affords a convenient way to control the rate of oxygenation.

The apparatus and process of the invention has particular application in veterinary science, both as an experimental tool and a practical means of oxygenating blood in vivo.

The apparatus is usually designed to accommodate a flow of from 200 to 5,000 ml. per minute of blood.

Blood flow rates can be maintained at very high rates through the apparatus of the invention, rates of 800–2,500 cc./per minute per 0.1 square foot have been attained.

ILLUSTRATIVE EMBODIMENT OF THE INVENTION

In this application and accompanying drawings, we have shown and described a preferred embodiment of our invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

Figure 1:
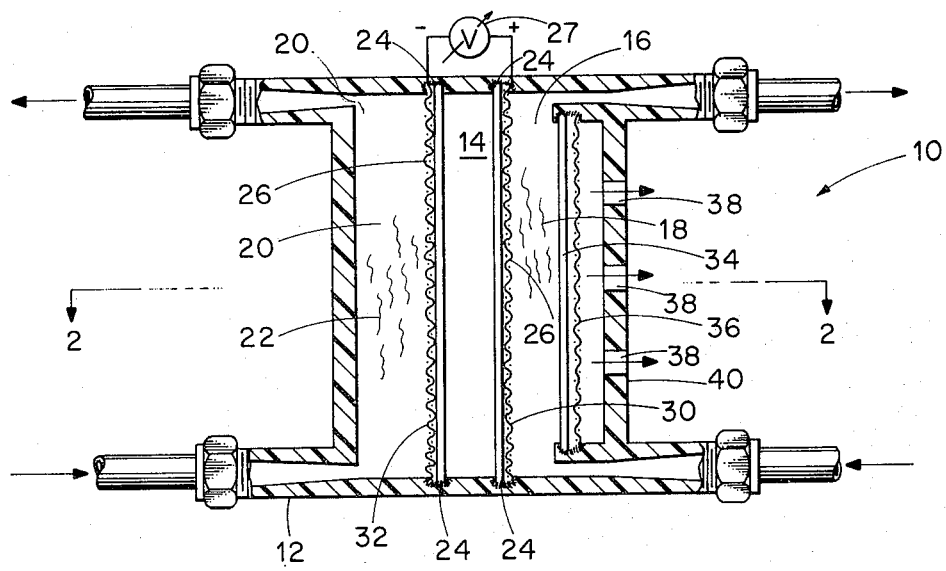
FIG. 1 is a somewhat schematic elevation, in section, of an oxygenator constructed according to the invention.
Figure 2:
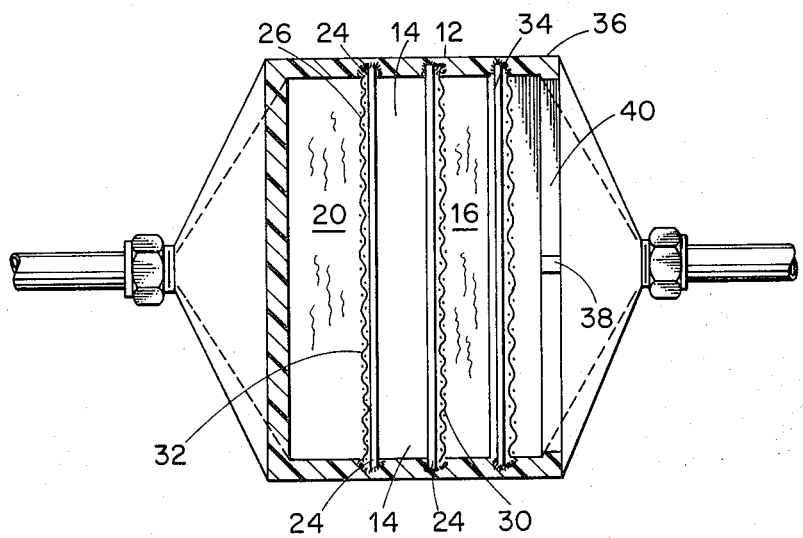
FIG. 2 is a plan view of the apparatus shown in FIG. 1, but taken along the line A—A thereof.

Referring to FIG. 1, it is seen that an oxygenator 10 is formed of an outer container 12. Within container 12 is mounted a cationic ion exchange membrane 14 of the per(fluorosulfonic acid) type previously described. This membrane 14 separates a blood chamber 16 through which blood 18 is circulated and a hydrogen-purge, or electrolysis, chamber 20 through which a sterile saline solution 22 containing 900 milligrams of salt per 100 milliliters of water is circulated.

A porous particulate platinum black catalyst layer 24 is embedded into the surface on each side of membrane 14. Immediately adjacent to each catalyst layer 24 are gold collector screens 26 which serve as electrodes and also serve to help support the membrane in place. Each collector screen 26 is connected to a voltage source 28 so that the screen in blood chamber 16 serves as an anode 30, and the screen in chamber 20 serves as a cathode 32. Voltage control 27 controls oxygen output.

When a suitable voltage is applied across membrane 14, water is decomposed proximate the cathode with the evolution of hydrogen gas and an oxygen atom which is negatively charged:

$$2 \text{ electrons} + H_2O \rightarrow H_2\uparrow + O^=$$

The hydrogen gas is carried away in solution 22, but the negatively-charged oxygen tends to be carried through membrane 14 to anode 30. Anode 30 forms means to remove the excess electrons from the oxygen so carried and, consequently, converts the negatively-charged oxygen into molecular oxygen:

$$O^= - 2 \text{ electrons} \rightarrow O$$

The oxygen then reacts with the blood being circulated through compartment 20.

Carbon dioxide, normally present in the blood, escapes through silicone rubber membrane 34, a membrane of the type heretofore referred to as the "Melrose membrane." In the illustrated embodiment of the invention, membrane 34 is backed by a support screen 36, which screen is mounted in front of apertures 38 in wall 40 of container 12.

It will be obvious from reading the foregoing specifications that the major portion of oxygen is normally made available to the blood in the monatomic or nascent form. One advantage of the invention is this use of nascent oxygen and the consequent ability of the apparatus to function with a minimum gas-blood interface.

It should be noted that, depending on the period of time for which the apparatus of the invention is to be operated and on the nature and type of any anticoagulants added to blood circulating therethrough, it may be desirable to treat various blood-contacting surfaces of the device with thrombosis-ressitant coatings. In some such embodiments of the invention, the anode, i.e. the side of the membrane at which nascent oxygen would normally be evolved may be coated with an oxygen-permeable coating largely insulating the anode from direct contact with blood. In some such embodiments, much or all the nascent oxygen may combine into molecular form before reaching the blood being treated. Nevertheless, substantial advantages of the apparatus utilizing a non-coated membrane still remain: the device is still compact and it can be readily controlled by adjusting the voltage. Moreover, the coating need not be a "diffusion" type barrier, but can be a microporous barrier having a very large permeability to gas, although providing a substantially impermeable barrier to the flow of liquid generally or blood in particular.

The invention accordignly comprises the several steps and the relation of one or more of such steps with respect to each of the others, and the apparatus embodying features of construction, combinations of elements and arrangement of parts which are adapted to effect such steps, all as exemplified in the foregoing detailed disclosure, and the scope of the invention will be indicated in the claims set forth below.

What is claimed is:

1. A blood oxygenator comprising
   (a) an oxygenating compartment for receiving blood to be oxygenated,
   (b) a means for supplying nascent oxygen into said compartment, and
   (c) a carbon dioxide-permeable, blood-retentive barrier forming means to remove carbon dioxide from said blood being oxygenated.

2. A blood oxygenator as defined in claim 1 wherein said means for supplying nascent oxygen is an oxygen-generating electrode.

3. A blood oxygenator as defined in claim 2 wherein said carbon dioxide-permeable, blood-retentive barrier is a membrane formed of a thin polymeric film.

4. A blood oxygenator as defined in claim 1 wherein said means to remove carbon dioxide in a carbon dioxide-permeable, blood-retentive barrier is a membrane formed of a thin polymeric film.

5. A blood oxygenator as defined in claim 4 wherein said thin polymeric film is a silicone rubber film.

6. A blood oxygenator comprising an oxygenating compartment for receiving blood to be oxygenated, said compartment being partly defined by
   (a) an ion exchange membrane and partly defined by
   (b) a carbon dioxide-permeable, blood-impermeable polymeric membrane.

7. A blood oxygenator as defined in claim 6 wherein said polymeric membrane is a silicone rubber membrane.

8. A blood oxygenator as defined in claim 7 wherein said ion exchange membrane is a sulfonated fluorinated polymer.

9. A blood oxygenator comprising
   (a) an oxygenated conduit for passage of blood to be oxygenated,
   (b) a second conduit for passage of aqueous hydrogen purging liquid therethrough,
   (c) an ion exchange membrane mounted as separation means between said oxygenating conduit and said second conduit,
   (d) a cathode mounted in said second conduit proximate said ion exchange membrane,
   (e) an anode mounted in said oxygenating conduit proximate said ion exchange membrane,
   (f) and means for removing carbon dioxide from said blood.

10. A blood oxygenator as defined in claim 9 wherein said means for removing carbon dioxide in a carbon-dioxide permeable, blood-impermeable polymeric membrane forming a surface area of said oxygenating conduit whereby carbon dioxide is removed from blood passing therethrough.

11. A blood oxygenator as defined in claim 9 wherein an electrolysis-promoting catalyst is embedded at that surface of said ion-exchange membrane proximate the cathode.

12. A blood oxygenator comprising
   (a) an oxygenating compartment for receiving blood to be oxygenated,
   (b) a means for supplying nascent oxygen into said compartment and
   (c) means for removing carbon dioxide from said blood.

13. A blood oxygenator of the type defined in claim 12 comprising an oxygen-generating electrode as said source of nascent oxygen and a voltage control means for moderating the rate of oxygen evolved at said electrode.

14. A process for oxgenating blood comprising the steps of
   (a) passing blood through a treating zone of apparatus external to the body,
   (b) injecting nascent oxygen into said blood as it passes through said treating zone, and
   (c) simultaneously removing carbon dioxide from said blood through a blood-impermeable membrane.

15. A process as defined in claim 14 comprising the steps of generating said oxygen by the electrolytic decomposition of water, passing the resulting negatively charged oxygen ions through a cationic ion exchange membrane, and forming oxygen in said blood treating zone.

16. A process for oxygenating blood comprising the steps of generating oxygen by electrolytic decomposition of water on one side of an ion exchange membrane, passing resulting negatively charged oxygen ions through an ion exchange membrane, forming oxygen at an anode on the other side of said membrane, and continuously causing blood to flow proximate said anode to receive said oxygen formed at said anode.

References Cited
UNITED STATES PATENTS

| 3,400,054 | 9/1968 | Ruka et al. | 136—86 F |
| 2,978,402 | 4/1961 | Hoch et al. | 204—296 |

HOWARD S. WILLIAMS, Primary Examiner

R. L. ANDREWS, Assistant Examiner

U.S. Cl. X.R.

55—158; 204—131, 263, 296